R. EATON.
Freight-Cars.

No. 158,261.  Patented Dec. 29, 1874.

Witnesses:
Chas. Nida
H. L. Wattenberg

Inventor:
Richard Eaton
per Geo. H. Knights
Atty

UNITED STATES PATENT OFFICE.

RICHARD EATON, OF MONTREAL, CANADA.

IMPROVEMENT IN FREIGHT-CARS.

Specification forming part of Letters Patent No. 158,261, dated December 29, 1874; application filed December 7, 1874.

*To all whom it may concern:*

Be it known that I, RICHARD EATON, of Montreal, in the Province of Quebec, Dominion of Canada, have invented a new and useful Improvement in Railroad-Cars; and that the following is a full, clear, and exact description of the same, reference being had to the accompanying drawings, and to the letters of reference marked thereon, making a part of this specification.

This invention is in the nature of an improvement in railroad-cars; and the invention consists in a railroad freight-car constructed with a single truck having six wheels, each of such wheels provided with a separate spring or springs, and the truck attached to the body of the car by a king-bolt.

Figure 1:
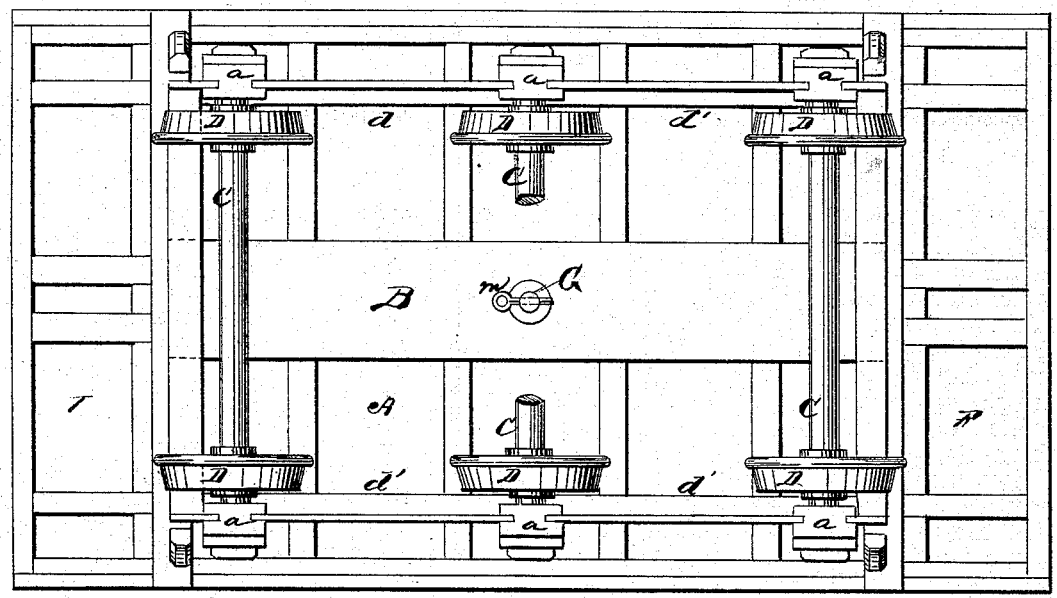
Figure 2:
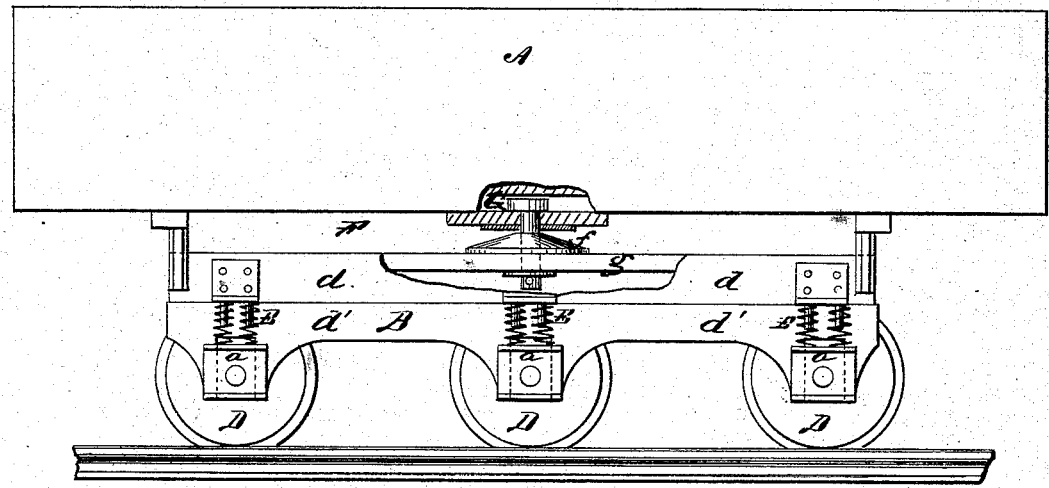
Figure 3:
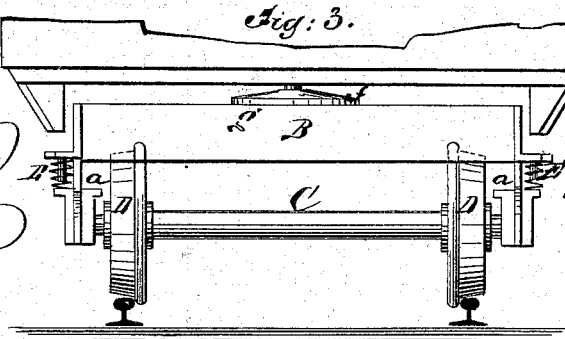

In the accompanying sheet of drawings, Figure 1 is a plan view of under side of truck and car; Fig. 2, a side elevation, partly in section; and Fig. 3, an end view of same.

Similar letters of reference indicate like parts in the several figures.

In order that the weight of the car and its load may be more evenly borne on the supporting-wheels, and thus enable the car to carry a much larger load than is done by cars of ordinary construction, it is found desirable, particularly in freight-cars, to support the body on a single truck of six wheels, among which the load is evenly distributed without strain to the body of the car; but the six wheels heretofore affixed to such cars have been so secured to the side sills or bearing-beams as to preclude their having any vertical play, the result being that any slight obstacle on the rail—as, for instance, an uneven rail-joint—would tend to lift all the cars from the rail at the same time, since the raising of one end of the car or bearing-beams would necessarily incline the whole beam upward, and the wheels being rigidly attached to this beam or the sill of the car, they would necessarily be raised from the track. This accident would most surely occur if the middle one of the three wheels were raised by the obstruction, since the raising of the middle wheel would lift the wheels on either side of it, and the car would jump the track as a matter of course. This difficulty is believed to be fully obviated by my invention, as well as another, viz., the difficulty of drawing a long train of heavily-laden (six-wheel) freight-cars around a sharp corner when the wheels are so fixed that they cannot adjust themselves laterally to the radius of the corner; their flanges bear with great pressure on the sides of the rails, rendering it difficult for any ordinary locomotive to draw the train.

To remedy this serious defect, the six wheels of my cars are secured to a truck, and the truck is attached to the body of a car by a king-bolt or swivel-pin, so that as the cars pass around a corner, the truck springs to the radius the moment the flanges of the wheels begin to bind, and the cars are in consequence hauled with but little or no more difficulty than on a straight track.

The six wheels of my freight-car are placed, as near as may be, two under the front end of the car, two under the center, and two beneath the rear end of the car, so that the whole under surface or floor of the car is well and evenly supported, as will be seen from the following description.

A represents a freight-car, which may be made from any desirable material, and of any convenient size and shape. This car is supported by a truck, B, the frame-work of which is of the ordinary or of any other construction. Secured to this frame-work, in suitable bearings $a$, are three axles, C, with a wheel, D, at each end of the same. Immediately over each bearing $a$ is fixed a spring, E, of rubber or other elastic material. These springs are so secured between the side frame-work $d$ $d'$ of the truck B that any inequality on the rail will cause the wheels and their bearings to be successively raised or lifted over the obstacle, the concussion being borne by the springs E, and the truck and car preserving their horizontal position. The upward movement of each of the wheels as they successively pass the inequality being independent of the other wheels of the truck, they are left undisturbed in contact with the track, and all tendency of the truck or car to jump the track is prevented, which obviously would not be the case if the wheels were secured without vertical play to the side frame of the truck, as before stated. The truck B being constructed with its six wheels and springs, as described, it is attached to the body of the car, or rather to the under frame-work F of the same, by a king-bolt, G. This king-bolt may pass through the floor of the car, and through a curved bolster-plate, f, secured to the supporting-beams g of the same, thence through suitable plates h h, fastened to the cross-beams k of the truck B, the lower end of the bolt protruding through these timbers, to which it is confined by a key, m, passing through the same. The truck being in this way secured, it can freely turn or swivel on the king-bolt G, and in this way accommodate itself to any degree of curvature in the track, as hereinbefore recited.

I am aware that securing car-trucks to the body of the cars by a king-bolt, and providing the wheels or axles of the truck with springs, is not new. I am also aware that a rail-car with two six-wheel trucks is not new, and I do not claim the same, broadly; but What I do claim as new, and desire to secure by Letters Patent, is—

A freight-car with a single truck, provided with six wheels, the bearings of each of said wheels having independent vertical play and springs, and the truck and car secured together by a king-bolt, all combined substantially as and for the purpose described.

RICHARD EATON.

Witnesses:
H. L. WATTENBERG,
G. M. PLYMPTON.